Jan. 19, 1960   J. C. HENDRY   2,921,341
METHOD AND APPARATUS FOR INJECTION MOLDING OF PLASTICS
Filed Aug. 16, 1956   2 Sheets-Sheet 1

Inventor
John Caine Hendry
By Barnes, Kisselle, Laughlin & Raisch
Attorney

Jan. 19, 1960 J. C. HENDRY 2,921,341
METHOD AND APPARATUS FOR INJECTION MOLDING OF PLASTICS
Filed Aug. 16, 1956 2 Sheets-Sheet 2

Inventor
John Caine Hendry
By
Barnes, Kisselle, Laughlin & Raisch
Attorney

United States Patent Office 2,921,341
Patented Jan. 19, 1960

2,921,341

METHOD AND APPARATUS FOR INJECTION MOLDING OF PLASTICS

John Caine Hendry, Detroit, Mich.

Application August 16, 1956, Serial No. 604,418

4 Claims. (Cl. 18—30)

This invention relates to a method and apparatus for injection molding plastic materials and particularly plastics of the rigid polyvinyl chloride type.

Plastics of the type described have always been difficult to mold properly with injection molding machines as heretofore manufactured. Parts molded from rigid polyvinyl chloride plastics do not possess a high impact strength and a high burst pressure unless the injection molding operation insures a combination of the proper amount of heat and a thorough homogenizing. Past practices have shown that in molding plastics of this type, satisfactory results are obtained only when the material when being plasticized is subjected to considerable mulling and the proper amount of heat. This action has been unobtainable with injection molding machines as heretofore constructed, where the material is plasticized by the application of pressure and externally applied heat and then forced through a relatively small orifice.

Another problem in connection with the molding of plastics has to do with the down time that is necessitated by cleaning the machine when it is desired to change from one color plastic to another.

The present invention has for its primary object the provision of a novel method for injection molding plastics of the type which have been considered heretofore as being difficult to mold.

A further object of the invention resides in the provision of an apparatus for molding polyvinyl chloride plastics which subjects the material to a proper mulling action and sufficient heat to produce very sound molded articles having high impact strength and a high burst pressure.

A further object of the invention resides in the provision of an injection molding converter which is designed so that in operation it is cleaned very readily at the end of each molding cycle.

The present invention contemplates a method for injection molding plastics wherein the plastic material is converted from the granular form to the proper plastic condition for injection molding by causing the material to flow through a relatively long tortuous passageway and generating substantial heat and pressure within the plastic material by controlling the friction between the stream of plastic and the passageway. The present invention also contemplates directing the plastic material through a converter to bring it to the proper plastic condition as it emerges from the converter and then substantially immediately directing it into the mold cavities.

More specifically, the invention comprises an injection molding machine which includes a generally cylindrically shaped converter having a spiral groove thereon which is designed to offer considerable resistance to flow of plastic material therethrough. The shape and the size of this spiral groove is such that the material being forced through the groove reaches the proper condition for molding as it emerges from the groove and the converter is so positioned that the plastic flows substantially directly into the mold cavities as it emerges from the converter. The converter is also designed such that at the end of each molding cycle, the spiral groove is substantially completely exposed so that the plastic remaining therein may be readily stripped from the groove and thus present a perfectly clean apparatus for the next molding cycle.

Figures 1, 2:
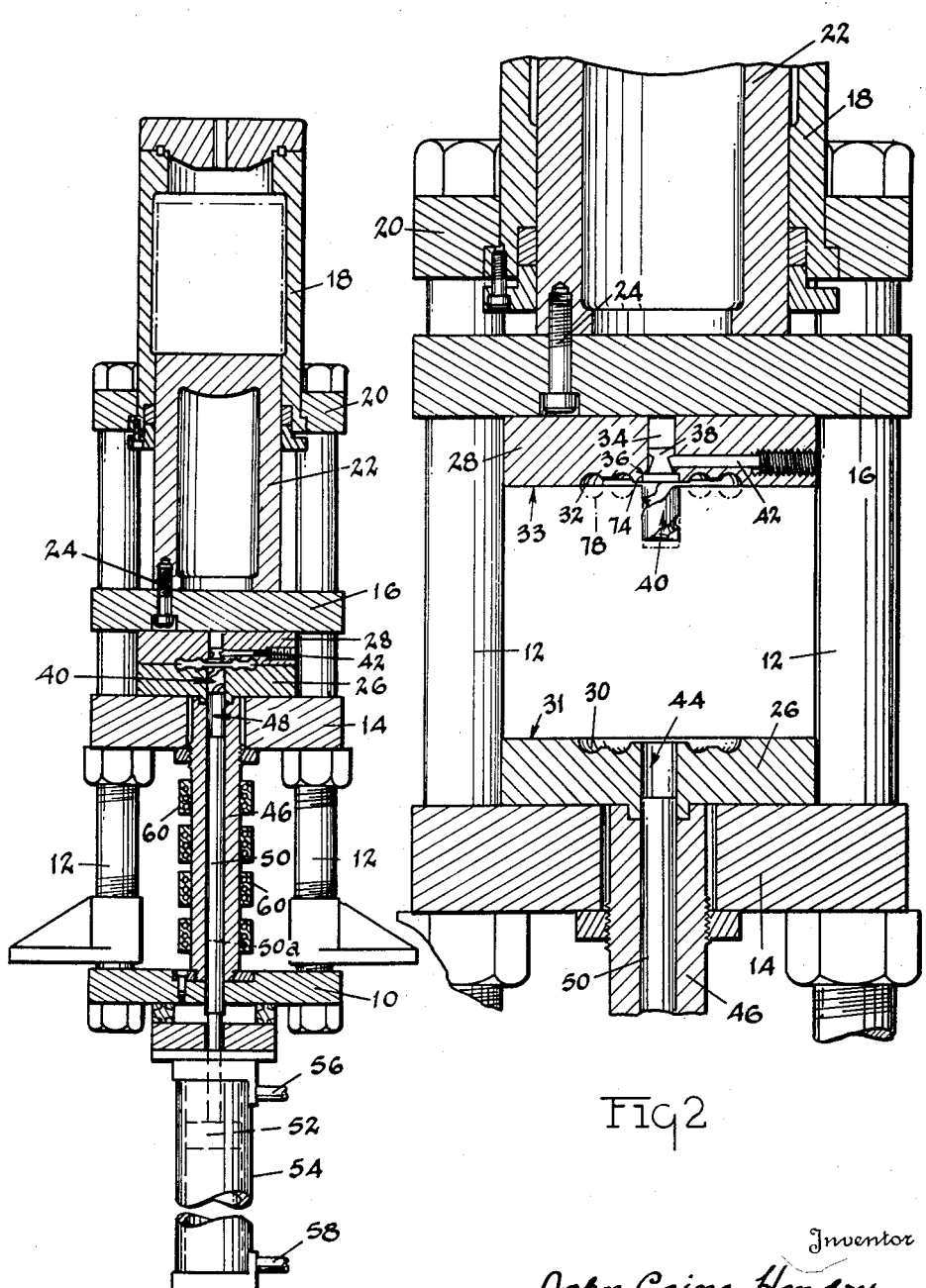
Fig. 1 is a vertical sectional view of an injection molding machine constructed in accordance with the present invention.
Fig. 2 is a fragmentary view of the machine shown in Fig. 1 on an enlarged scale and with the mold sections in the separated position.

The injection molding machine shown in Fig. 1 is in general similar to conventional injection molding presses and includes a base plate 10 having four vertical posts 12 mounted thereon. A lower platen 14 is fixedly mounted on posts 12 and an upper platen 16 is mounted on posts 12 for vertical movement. A hydraulic cylinder 18 is mounted on an upper plate 20 secured to the upper ends of posts 12. Within cylinder 18, there is arranged a piston 22. Upper platen 16 is secured directly to piston 22 as by screws 24. Suitable hydraulic mechanism is associated with cylinder piston assembly 18, 22 for actuating piston 22 and thereby moving platen 16 between the lower positions shown in solid lines and the upper position shown in broken lines. On the upper face of lower platen 14, a lower mold section 26 is mounted. A complementary upper half mold section 28 is mounted on the lower face of upper platen 16. The two mold sections 26, 28 are fashioned with cooperating mold cavities 30, 32 and parting faces 31, 33, respectively (Fig. 2). Upper mold section 28 is fashioned with a non-circular aperture 34 which is counterbored at the face 33 of the mold section as at 36. Within the aperture 34 is retained the supporting end 38 of a converter 40. A plunger 42 in mold section 28 is arranged to engage the angularly shaped supporting end 38 of converter 40 to fixedly support converter 40 in a depending position on upper mold section 28. Lower mold section 26 is provided with a bore 44 aligned axially with converter 40 and adapted to have a close fit therewith.

Between base 10 and lower platen 14, there is provided a cylindrical casing 46 centrally bored as at 48 to provide an injection chamber. At its upper end, chamber 48 connects with the lower end of bore 44 of the lower mold section 26. Within the bore 48 forming the injection chamber, there is arranged a ram 50, the lower end of which is connected with a piston 52 within a hydraulic cylinder 54. Suitable hydraulic connections 56 and 58 are provided on cylinder 54 for shifting piston 52 and ram 50 vertically. A plurality of heating coils 60 extend circumferentially around casing 46.

Figure 3:
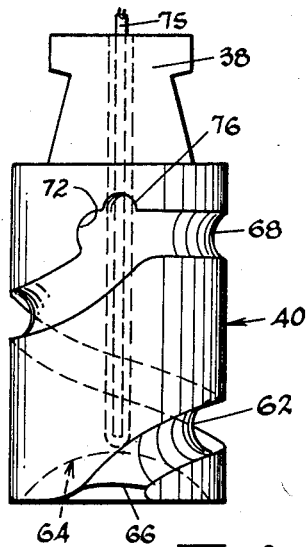
Fig. 3 is a side elevational view of one form of converter of the present invention.
Figure 4:
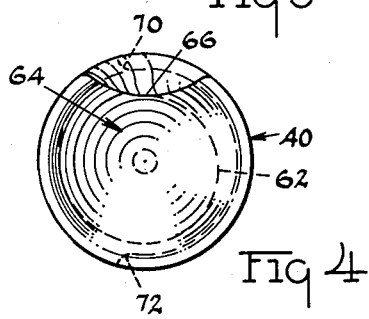
Fig. 4 is a bottom plan view of the converter shown in Fig. 3.

Referring now to Figs 3 and 4 wherein the converter 40 is shown in greater detail, it will be observed that the body portion of converter 40 is of cylindrical shape and provided with a spiral groove 62 around the outer surface thereof. Groove 62 is generally of semicircular cross section. The lower end face of converter 40 is formed with a generally semi-spherically shaped concavity 64. The lower end of spiral groove 62 blends smoothly into one side of concavity 64 to provide a tapering inlet passageway 66 from concavity 64 into groove 62. Inlet passageway 66 forms a relatively wide mouth which funnels the granular plastic material from chamber 48 into groove 62. The upper end of spiral groove 62 connects with a horizontal groove 68 that extends around the body portion of a converter 40 for about 180°. The opposite ends of the horizontal groove 68 are designated at 70 and 72. In the arrangement shown, the mold is provided with two sets of cavities and the plastic is fed to these cavities through diametrically opposed sprue openings 74. The body portion of converter 40 is provided with sockets 76 adjacent but spaced from the opposite ends 70, 72 of the horizontal groove 68. Sockets 76 register with the sprue openings 74 when the converter 40 is assembled with the upper mold section 28. If desired, converter 40 may be provided with an internal heating element 75.

At the beginning of a molding cycle, the upper platen is in the raised position so that the two mold sections 26 and 28 are in the separated condition shown in Fig. 2. A predetermined charge of granular plastic is preferably preheated by any suitable means. In most instances, preheating of the charge is a practical necessity because the plastic tends to absorb moisture which must be expelled therefrom in order to produce sound molded parts. The preheated charge is then inserted through the upper open end of bore 44 in mold section 26. At this time, it will be noted that since converter 40 is connected with mold section 28, it is in elevated position permitting access to bore 44. At the start of the operation, ram 50 is in the lowered position designated by broken lines 50a in Fig. 1 and the plastic charge therefore fills or at least partially fills the injection chamber 48. This chamber may be heated by the electric coils 60 so as to assist in elevating the temperature of the granular plastic material. The use of heating coils such as shown at 60 will depend upon the type of plastic material that is being molded. In most instances, heating will be required.

The cycle of the machine is then started by actuating the proper hydraulic controls to lower platen 16 and close mold section 28 on mold section 26. This moves converter 40 downwardly into bore 44 of mold 26 in the position shown in Fig. 1. Thereafter, the hydraulic controls associated with cylinder 54 are actuated to drive ram 50 upwardly at a predetermined rate. The plastic material is compressed as it is squeezed into concavity 64 and is further squeezed and compressed as it is funneled through passageway 66 into spiral groove 62. By reason of the pressure exerted against the plastic in this manner, the change in direction and compacting action imparted to it, and the friction encountered in passing into spiral groove 62 through passageway 66, the plastic material is mulled, compacted and densified and heat is generated to further raise the temperature thereof. As the plastic material is forced through passageway 62, its direction of flow is being continually changed and the friction thereby produced as the plastic flows upwardly around spiral 62 continues to raise the temperature of the plastic. Spiral groove 62, it will be observed, is of decreasing cross section in a direction from the concavity 64 to the horizontally extending groove 68. Therefore, as the plastic flows upwardly around groove 62, it is subjected to a progressively increasing compression or squeezing action. This compression, coupled with the friction created by flowing around the spiral groove, is such that when the plastic reaches the horizontally extending groove 68, it has attained the necessary molding temperature and is in the form of a densified homogeneous mass ready for molding. The moldable material then flows through the sprues 74 directly into the mold cavities to thus form the molded parts.

The shape of converter 40 and the manner in which the converter acts upon the plastic material is believed to be a very important feature of the present invention. As pointed out above, the concavity 64 at the lower end of the converter and the spiral groove 62 cooperate to initiate the compacting of the granular plastic and even more important, produce a mulling action on the plastic particles that insures the production of sound and homogeneous molded articles. By causing the particles of plastic to flow upwardly around concavity 64 and then to one side up through spiral groove 62, the plastic particles are subjected to a twisting and mixing action that provides a homogeneous mass of plastic. In other words, after the plastic has advanced a short distance up through spiral groove 62, the stream is in a plastic state throughout its entire cross section because of the mulling, mixing and compacting action that it has been subjected to previously. By reason of the progressively decreasing cross section of the spiral groove in the direction of the horizontal groove 63, the stream of plastic material is progressively compressed as it advances toward the mold. Thus, generally speaking, the converter is so shaped and designed so that as the plastic flows around the leading end portion of the converter, it is molded, mixed and compacted; and as the stream continues to flow upwardly toward the mold, it is subjected to further progressive compression and friction sufficient to convert the material to the required condition of fluidity for molding.

It will be appreciated that the plastic material at the leading end of the stream is not subjected to as much heat and pressure as the plastic material further down in the stream. In other words, at the very leading end of the stream, the plastic material is not subjected to any considerable pressure tending to resist its movement upwardly through the spiral path 62. However, this material is prevented from passing into the mold in this incompletely worked condition by the location and size of the sockets 76 and sprue openings 74 in relation to the horizontal groove 68. It will be observed that the sockets 76 and the sprue openings 74 are of smaller cross section than the horizontal groove 68. In addition, the ends 70 and 72 of groove 68 are located circumferentially beyond the sockets 76. Thus, as the leading end of the stream of plastic flows into groove 68, it builds up against the ends 70, 72 of the horizontal groove 68 before it flows upwardly into sockets 76 and out through sprue openings 74. Thus, the very leading end of the stream of plastic is either prevented from flowing into the mold or if it does flow into the mold, it is subjected to sufficient working to convert it into the necessary state of fluidity for molding.

The charge of plastic is predetermined such that when the mold cavities are filled, ram 50 has been moved upwardly to a position where its lower end is spaced just below the concavity 64. Thus, at the end of each cycle, a plastic material fills the mold cavity and extends backwardly down through spiral groove 66 which terminates in a gob of material in concavity 64.

Figure 7:
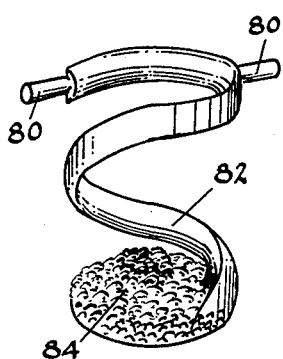
Fig. 7 is a perspective view of the sprue and material remaining attached to the converter at the end of each molding cycle.

The molded material is permitted to remain in the mold cavities for a predetermined interval of time to cure the material. This time interval is usually referred to as a "set-up time" and depends to some extent on the particular material being molded. Thereafter, the hydraulic controls associated with cylinder 18 are actuated to raise piston 22 and thus raise mold section 28 from mold section 26. As mold section 28 separates from mold section 26, the converter 40 is likewise raised and the plastic material around converter 40 and the mold pieces in the cavities 30, 32 are elevated with the upper mold section 28. This is illustrated by broken lines in Fig. 2. The work pieces designated 78 are stripped from the mold cavities 32 in the upper section 28 by separating them from the sprues 80. Thereafter, it is a simple matter to strip the sprues 80 and the connected spiral portion 82 of the plastic material and the gob 84 in concavity 64 from the converter. Thus, at the end of each cycle, the arrangement is absolutely clean and no additional cleaning of the passageways is required. The excess portion of the plastic material charge removed from the converter at the end of each cycle is shown in Fig. 7. At the gob 84, the plastic is in the form of discrete particles which adhere to one another to form a solid mass. These particles lose their identity as particles and form a somewhat homogeneous stream of plastic in spiral 82. It will be appreciated that the amount of this unused material is relatively small and furthermore that this discharge material can be reground for use in a subsequent cycle.

It will be appreciated, of course, that the shape of spiral groove 62, the cross sectional area of the spiral, the lead angle, the length of the spiral and the speed of the ram must be correlated to produce the required amount of compression, mulling and heating of the plastic to produce molded work pieces of high impact strength and burst pressure. These factors will, of course, vary somewhat with the type of plastic material being worked and the number and size of work pieces being molded from a single converter. The basic feature of the present arrangement is the working of the granular plastic material so as to subject it to a progressive squeeze or compression action coupled with the generating of considerable friction so that it is progressively heated and homogenized to a point where when it energes from the upper end of the converter, it is in the proper condition for molding. If the speed of ram 50, for example, is too rapid, the plastic material will merely compact into a rather rigid mass and will not flow properly through the spiral groove 62. The same is true if the lead angle of spiral groove 62 is too small.

Figure 5:
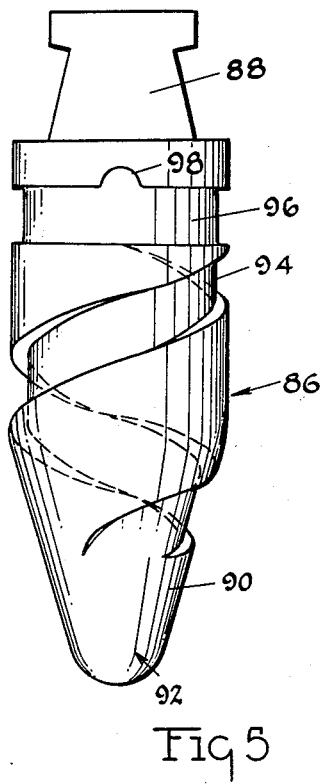
Fig. 5 is a side elevational view of another form of converter according to the present invention.
Figure 6:
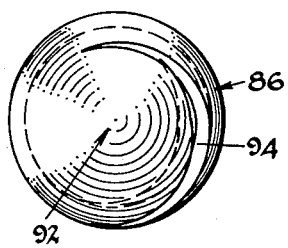
Fig. 6 is a bottom plan view of the converter shown in Fig. 5.

In Figs. 5 and 6, I have illustrated another form of converter that may be used in accordance with the present invention. This converter, which is generally designated 86, has a supporting portion 88 at the upper end thereof and a tapered nose portion 90 terminating in a rounded lower end 92. Around the outer surface of the body portion of converter 86, there is provided a spiral groove 94. Groove 94 starts on the tapered portion 90 of converter 86; and thus, in relation to the wall of bore 44 and lower die section 26, the groove 94 is of progressively decreasing cross section at the tapered portion 90 of the converter. At the cylindrical portion of converter 86, the groove 94 is machined with a progressively decreasing cross section. At its upper end, groove 94 merges with an annular horizontally disposed groove 96 fashioned with diametrically opposite sockets 98 for directing the plastic material into the sprue opening 74 of the mold sections. Sockets 98, it will be observed extend upwardly above groove 96. The converter 86 acts upon the plastic material being molded in substantially the same manner as the converter 40 previously described. However, the groove 94 is of rectangular shape in cross section; and thus, in general, more friction is generated in the type of groove shown at 94 as compared with a groove of arcuate cross section such as shown at 62. Under some conditions, a converter provided with a groove of rectangular cross section such as shown at 94 is not satisfactory because the plastic tends to burn around the corners of the groove. It will also be appreciated that with the type of converter shown in Figs. 5 and 6, the amount of material remaining on the converter after the end of a molding cycle is considerably greater than is the case with the converter shown at Figs. 3 and 4.

It will be appreciated that in injection molding plastics in accordance with the method and apparatus of this invention, the speed of the ram, the length and size of the spiral groove 62 and the pressure applied to the plastic are factors that will vary with reference to the type of plastic used. As an example, a converter of the type shown in Figs. 3 and 4 was constructed having a length of 3 5/16" from the lower edge thereof to the center line of groove 68 and a diameter of about 2½" with the spiral groove therein being ½" wide throughout its length and 3/8" deep at the mouth 66 and ¼" deep at the groove 68. The lead angle of the spiral was such that the spiral made one convolution from the mouth 66 to the socket 76, the sockets 76 being 3/8" in diameter. With a converter of these dimensions, rigid polyvinyl plastic was very successfully injection molded. In the case of high impact rigid polyvinyl (Goodrich No. 8700A), the plastic was injection molded at a rate of 1.82 cubic inches per second with a ram speed at 17¾" per minute; and with a general purpose rigid polyvinyl (Goodrich No. 8750A), the plastic was injection molded at a rate of 2.51 cubic inches per second with a ram speed of 24" per minute. With the high impact material, the line pressure on the ram was maintained at 1,800 pounds per square inch; and on the general purpose material, the line pressure on the ram was maintained at 1,950 to 2,000 pounds per square inch. With both of these materials, the mold was maintained at a temperature of 150° F. and the injection chamber was maintained at a temperature of 390° F. In each instance, a 150 pound mass of the material was maintained in a supply hopper at a temperature of 275° F. and then individual charges were heated to 365° F. in a period of three minutes before being charged into the injection chamber.

Thus, it will be seen that I have provided a method and apparatus for molding plastic material, particularly plastics of the rigid polyvinyl chloride type which heretofore have presented very serious problems from the standpoint of molding. The present invention enables such plastics to be molded economically and to produce parts having a high impact strength and high burst pressures. A further feature of the present invention which makes the arrangement here very desirable resides in the arrangement of the converter movably mounted as on the movable mold section which enables the plastic to be stripped clean from the apparatus at the end of each molding cycle, thus eliminating the clean-out time required in injection molding presses of the prior art. This is especially desirable when it is desired to change from one color plastic to another color.

I claim:

1. The method of molding plastic material of the rigid polyvinyl chloride type which comprises applying pressure to an individual charge of said plastic material in granular form to compact the charge and to cause the plastic material to move in a continuous, uninterrupted stream, converting said plastic material to a condition of homogeneous plasticity suitable for molding as it is moved in said stream primarily by continuing the application of pressure to one end of the stream of plastic material, while progressively reducing the cross section of said stream to subject the plastic to a progressively increasing squeezing action and simultaneously therewith continually changing the direction of flow of the stream so that the heat, pressure and mechanical working resulting therefrom converts the leading end of the stream at a predetermined point in its path of movement to a condition of plasticity suitable for molding, and directing the stream of plastic material as it is progressively converted to said condition of plasticity directly into a mold while continuing the application of said pressure.

2. The method set forth in claim 1 wherein the step of continuously changing the direction of said stream is achieved by moving said plastic material in a spiral path.

3. A converter for a plastic molding machine comprising a generally cylindrical body having a spiral groove therein extending axially and around the outer periphery of the body and terminating adjacent opposite ends of the body, said groove being of progressively decreasing cross sectional area in a direction towards one end of the body, said groove at the opposite end of the body having a mouth portion of substantially greater cross sectional area than the remaining portion of the groove, said body being provided with a concave end face adjacent the mouth portion of the groove.

4. A converter for a plastic molding machine comprising a generally cylindrical body having a spiral groove therein extending axially and around the outer periphery of the body, said groove being of progressively decreasing cross section toward one end of said body, said end of said body being provided with a circumferentially extending groove communicating with the adjacent end of said spiral groove and means forming a socket on said body communicating with said circumferentially extending groove, said socket being offset from the axis of said circumferential groove towards the side thereof opposite said spiral groove.

References Cited in the file of this patent

UNITED STATES PATENTS

| | | |
|---|---|---|
| 2,410,510 | Lester | Nov. 5, 1946 |
| 2,669,750 | Keeney | Feb. 23, 1954 |
| 2,790,203 | Dykehouse | Apr. 30, 1957 |